United States Patent [19]

Gotoh et al.

[11] Patent Number: 4,704,618
[45] Date of Patent: Nov. 3, 1987

[54] SIGNAL-PROCESSING CIRCUIT FOR HEAT-SENSITIVE RECORDING APPARATUS

[75] Inventors: Toshihiko Gotoh, Tokyo; Takahiko Yoshida, Ebina; Yasunori Kobori, Yokohama, all of Japan

[73] Assignee: Hitachi, LTD., Tokyo, Japan

[21] Appl. No.: 911,074

[22] Filed: Sep. 24, 1986

[30] Foreign Application Priority Data

Sep. 25, 1985 [JP] Japan .................................. 60-209912

[51] Int. Cl.[4] .......................... G01D 15/10; B41J 3/20
[52] U.S. Cl. ................................ 346/76 PH; 400/120
[58] Field of Search .................... 346/76 PH; 400/120

[56] References Cited

U.S. PATENT DOCUMENTS 4,563,691  1/1986  Noguchi et al. ............... 346/76 PH Primary Examiner—E. A. Goldberg
Assistant Examiner—Gerald E. Preston
Attorney, Agent, or Firm—Antonelli, Terry & Wands

[57] ABSTRACT

A signal-processing circuit of a heat-sensitive recording apparatus comprising a temperature detector for detecting the temperature near a heat-sensitive head is disclosed, in which an energization code train read from a ROM for storing the energization time-concentration characteristics corresponding to the γ characteristic of the inking paper is corrected in accordance with the head temperature, and a print is produced in accordance with the energization code train thus corrected.

5 Claims, 8 Drawing Figures

SIGNAL-PROCESSING CIRCUIT FOR HEAT-SENSITIVE RECORDING APPARATUS

BACKGROUND OF THE INVENTION

The present invention relates to a signal-processing circuit of a heat-sensitive recording apparatus in which a heat-generating member is heated by being energized, and a recording medium such as inking paper provided in contact with the heat-generating member is heated for transfer to the recording paper by sublimation or fusion, thereby reproducing an image on the recording paper, or more in particular to a signal-processing circuit for reproducing an image with a gradation by controlling the energization time of the heat-generating member.

Generally, the relationship between the time of heat application to a recording medium such as inking paper, that is, the energization time of a heat-generating member and the pigment concentration (coloring concentration) on the recording paper is not linear as shown in FIG. 5. As apparent from the energization time-coloring concentration characteristic shown in FIG. 5, the inclination is gentle at the high-concentration and low-concentration parts, requiring a longer energization time for obtaining the same concentration change.

If an original image is to be correctly reproduced from a video signal of an image having gradations (a plurality of levels of the coloring concentration), therefore, it is necessary to change the energization time of the heat-generating member in accordance with the gradation.

Conventional heat-sensitive recording apparatuses comprise a read-only memory (called a "$\gamma$ memory") for storing the energization time-coloring concentration characteristic (called a "$\gamma$ characteristic"), whereby at the time of printing, the video signal is converted to generate a train of energization codes representing the energization time of the heat-generating member corresponding to the video signal from the data read from the $\gamma$ memory, and the heat-generating member is energized by supplying current thereto for a time period corresponding to the data of the energization code train thereby to produce a print. A heat-sensitive recording apparatus of this type is disclosed in Japanese Examined Patent Publication No. 59-17954 and Japanese Unexamined Patent Publication No. 57-48868.

The $\gamma$ characteristic depends on the ambient temperature of the heat-generating member.

FIG. 6 shows the $\gamma$ characteristic for two different ambient temperatures. The $\gamma$ characteristic of FIG. 6(b) represents an ambient temperature higher than that of FIG. 6(a).

Because of this dependency of the $\gamma$ characteristic on the ambient temperature of the heat-generating member, if a print of a gradation equal to that of an original image is to be obtained, it is necessary to store data on the $\gamma$ characteristics for a plurality of ambient temperatures in memory and switch the data on the $\gamma$ characteristics in accordance with the actual ambient temperature, resulting in a bulky memory.

For producing a color print, on the other hand, it is necessary to lay prints of three colors one on another with inking paper of the three primary colors. The inking paper of the three primary colors have different $\gamma$ characteristics.

FIG. 7 snows example of the $\gamma$ characteristics of the three primary colors of cyan (Cy), magenta (Mg) and yellow (Ye). in this case, the inclination of the $\gamma$ characteristic decreases for cyan (Cy), magenta (Mg) and yellow (Ye) in that order.

Production of a color print, therefore, requires the $\gamma$ characteristics for each of the three primary colors to be stored in the $\gamma$ memory, thereby further increasing the capacity of the $\gamma$ memory.

If about ten different characteristic values at 5° C. intervals of the temperature near the heat-generating member are set in the ROM in advance for the recording media representing the three colors, and the characteristic to be read out is changed each time of printing, then the required capacity of the ROM becomes 30 times larger. If the number of gradation is to be increased twice, on the other hand, the required ROM capacity is as much as 60 times larger, thereby making practical applications difficult.

SUMMARY OF THE INVENTION

The object of the present invention is to provide a heat-sensitive recording apparatus capable of high-gradation printing without increasing the capacity of the ROM for storing the energization time-coloring concentration characteristic.

According to the present invention, there is provided a signal processing circuit of a heat-sensitive recording apparatus, comprising an initial value memory for storing the data for calculating the $\gamma$ characteristic in standard state, and a correction data memory for storing data on the change of the $\gamma$ characteristics with the ambient temperature of a heat-generating member and data on the change of the $\gamma$ characteristics with the type of the inking paper, wherein the data on the $\gamma$ characteristic read from the initial value memory are corrected by the correction data read from the correction data memory in accordance with the ambient temperature and the type of inking paper, so that the heat-generating member is energized by a code train signal representing the energization time determined on the basis of the $\gamma$ characteristic data thus corrected.

As a result, only one $\gamma$ characteristic data may be stored in the initial value memory, thereby reducing the capacity of the $\gamma$ memory. The correction data memory, the capacity of which is small as compared with the $\gamma$ memory, poses no problem by addition thereof.

DESCRIPTION OF THE PREFERRED EMBODIMENTS

Figure 1:
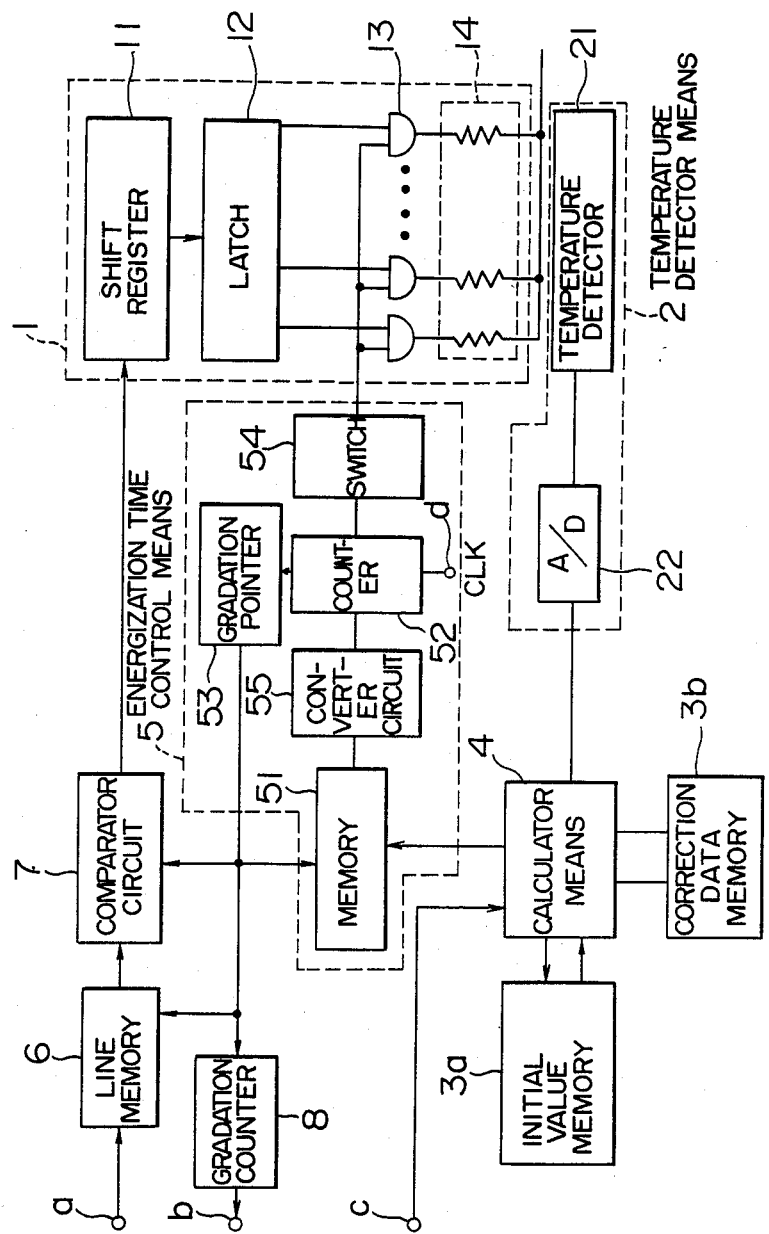
FIG. 1 is a block diagram showing an embodiment of the present invention.

A construction of an embodiment of the present invention is shown in FIG. 1. A heat-sensitive printer to which the present invention is applied comprises a heat-sensitive head 1, temperature detector means 2 including a temperature detector 21 and an analog-digital converter (abbreviated as an "A/D converter") 22, an initial value memory 3a for storing the data on the energization time and the coloring concentration characteristic at standard temperature, a correction data memory 3b for storing correction data relating to the energization time coloring concentration characteristic (γ characteristic) depending on the ambient temperature of the heat-sensitive head 1 and the inking paper, calculation means 4 for calculating the energization time data (energization code) for each gradation corresponding to the temperature at the time of printing on the basis of data from the temperature detector means 2 and the initial value memory 3, and energization time control means 5 including a memory 51 for storing the energization code calculated in the calculation means 4 for each address corresponding to the gradation, a line memory 6 for storing the video signal for a single line printed, and a comparator circuit 7 supplied with digital video signals from the line memory 6 sequentially for each picture element, comparing the digital values representing the gradation indicated by a gradation pointer 53 with the digital values of the video signal, and producing a "1" signal when the digital value of the video signal is higher than that of the gradation pointer and a "0" signal when the digital value of the video signal is lower.

The energization time control means 5 includes a memory 51, a counter 52, a gradation pointer 53, a switch 54 and a converter 55. The heat-sensitive head 1 includes a shift register 11 supplied with serial heating data from the comparator circuit and producing parallel data at the end of application thereto of a line of data, a latch circuit for holding the parallel data from the shift register 11 over a 1-line printing period, and an AND circuit 13 connected for each bit of the latch circuit and masking and applying to a heat-generating resistor 14 an output signal from the latch circuit in response to an output signal from a switch 54.

First, the operation of the whole cirucit will be explained.

Figure 2:
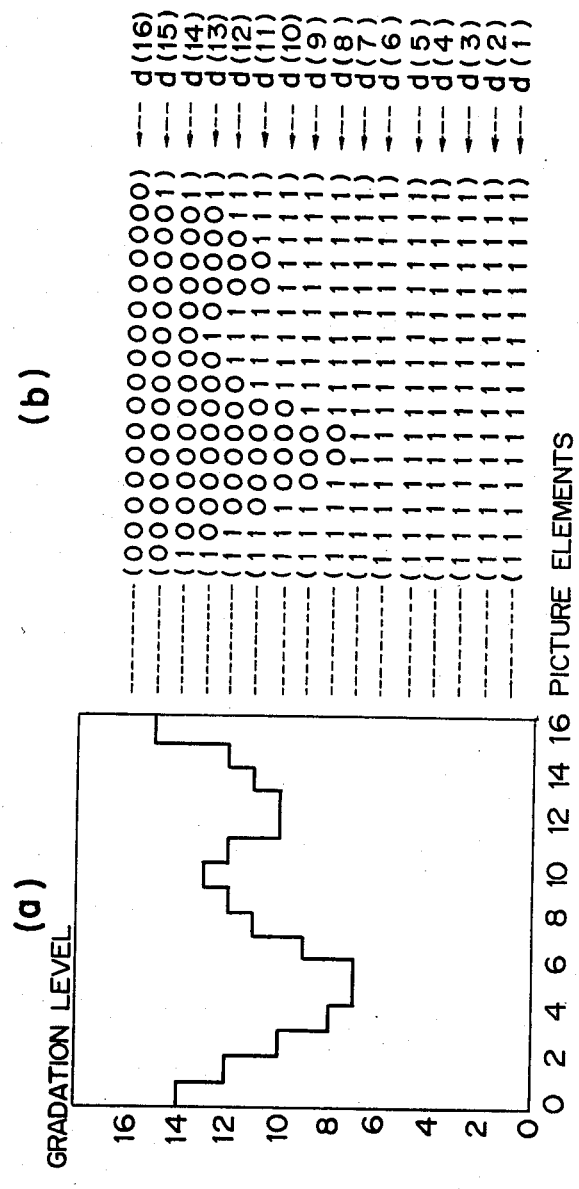
FIG. 2(a) and FIG. 2(b) is a complementary diagram showing an example of an energization code and a video signal.

The video signal applied to the video signal input terminal a is held at the line memory 6 by one line in accordance with a control signal applied from the gradation pointer 53. In the explanation that follows, it is assumed that the video signal held at the line memory 6 has a gradation level as shown in FIG. 2(a). For simplification, the picture elements are assumed to be 16 with 16 gradations.

First, the gradation pointer 53 is set to the gradation level "1" by the counter 52. The video signal held the line memory 6 is applied to the comparator circuit 7 sequentially for each picture element (corresponding to a print made by one heat-generating resistor 14 of the heat-sensitive head 1). The comparator circuit 7 compares the video signal with the gradation level indicated by the gradation pointer 53 for generating a mask data signal for masking the output of the switch 54, the mask data signal being applied to the shift register 11. Upon application of the video signal of FIG. 2(a) to the line memory 6, a heating data signal of 16 bits all "1" as shown in FIG. 2(b) for the gradation level "1" is produced from the comparator circuit 7 and applied to the shift register 11. The data stored in the shift register 11 is applied to the latch circuit 12, and to the heat-generating resistor 14 through the AND circuit 13 for each bit. When the switch 54 produces a "1" signal, only that output of the AND circuit which corresponds to the data of "1" bit held at the latch circuit 12 becomes "high" level, thereby generating heat in the heat-generating circuit with an output signal connected to a high-level AND circuit. The switch 54 is turned on only for the energization time determined from the characteristic of the inking paper as described below. In the case where the gradation level is "1", all the bits of the video signal shown in FIG. 2(a) are "1", and therefore all the heat-generating resistors 14 generate heat.

Upon completion of heat generation for the gradation level "1" as mentioned above, the output of the gradation pointer 53 increases, so that a similar operation is performed for the gradation level "2". When the gradation level increases to "8" with the output of the gradation pointer 53, the heat-generation data for the fifth and sixth bits become "0", and therefore only the fifth and sixth resistors of the heat-generating resistor 14 cease heat generation. This operation is repeated, and upon completion of heat generation up to the gradation level "16", the printing of the video signal for one line is terminated.

The gradation counter 8 detects an output signal from the gradation pointer 53, and upon completion of the printing over all the gradations, produces an image renewal request output signal from the terminal b. In response to the image renewal request output, a video signal of the next line is applied to the line memory 6, so that the printing operation for the next line is performed in the same manner as mentioned above.

The memory 51 has stored therein a train of energization codes calculated by the calculator means in accordance with the characteristics corrected by the correction data read from the correction data memory 3B. obtained from the γ characteristic data read from the initial value memory 3a on the basis of the type of the inking paper of cyan, magenta, yellow and black and the head temperature detected by the temperature detector means.

Now, the energization codes stored in the memory 51 and the operation for producing them will be explained.

Figure 3:
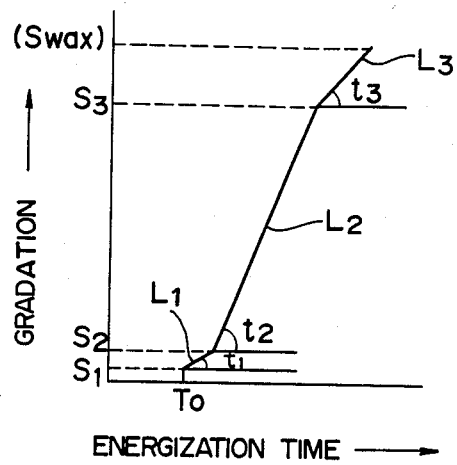
FIGS. 3 and 4 are graphs of polygonal graphs representing the energization time and concentration characteristics.

The initial value memory 3a has stored therein data for approximation into polygonal line of the characteristics of the coloring concentration corresponding to the energization time. In the case where the coloring concentration characteristic is approximated by a number n of linear lines (n=3 in FIG. 3) Li (i=1, 2, ..., n) as shown in FIG. 3, the initial value data for calculating the starting gradation Si for the standard temperature of each linear line Li, the initial inclination $t_i$ thereof, the inclination change coefficient $\Delta t_i$ with temperature change, conduction time $T_0$ before the first gradation $S_1$, and the change in energization time against the change of the approximated linear lines with temperature are stored in the initial value memory 3a.

The calculation means 4 reads the correction data from the correction data memory 3b in accordance with the type of the inking paper applied from the terminal c and the temperature of the head 1 detected by the temperature detector means 2 and corrects the γ characteristic data read from the initial value data memory 3a thereby to generate a train of energization codes corresponding to the type of the inking paper and the temperature of the head 1.

The energization codes shown in Table 1, for instance, are generated in accordance with the energization time.

TABLE 1

| Energization code | Energization time (ms) | Energization code | Energization time |
|---|---|---|---|
| 0 | 0.2 | 4 | 1.2 |

TABLE 1-continued

| Energization code | Energization time (ms) | Energization code | Energization time |
| --- | --- | --- | --- |
| 1 | 0.4 | 5 | 1.4 |
| 2 | 0.8 | 6 | 1.6 |
| 3 | 1.0 | 7 | 2.0 |

The energization code train includes a plurality of energization codes corresponding to the energization time required for changing from one gradation to next in accordance with the energization time-concentration characteristic which energization codes are selected from Table 1 and arranged continuously from gradation 1 to maximum gradation.

Figure 4:
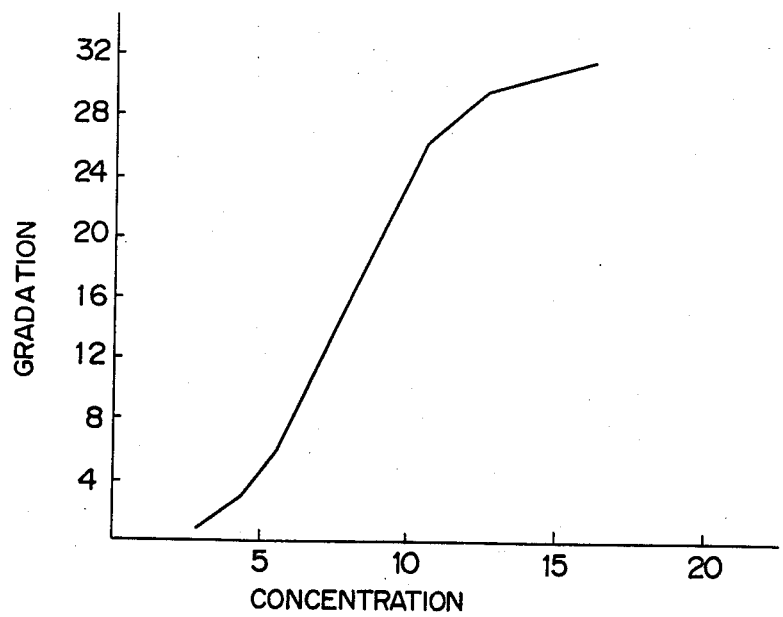
Figure 5:
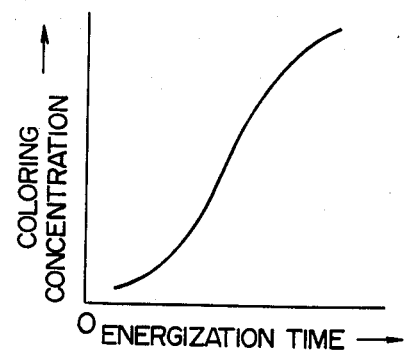
FIGS. 5, 6 and 7 are graphs of the energization time and concentration characteristics.
Figure 6:
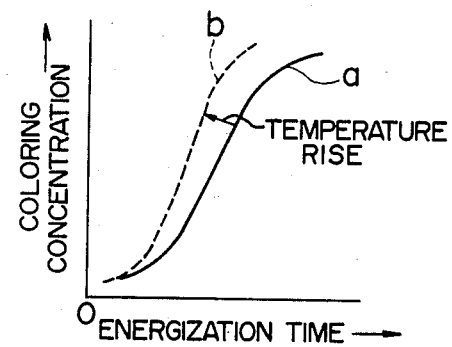
Figure 7:
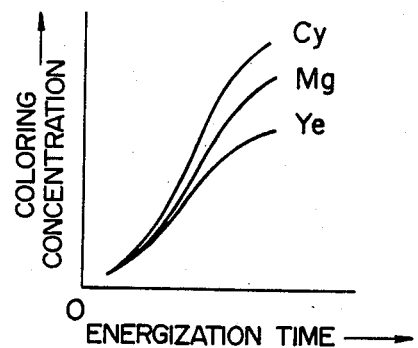

FIG. 4 shows an energization time-concentration characteristic and Table 2 an example of energization code train corresponding thereto.

TABLE 2

| Gradation | Code | Accumulation time | Gradation | Code | Accumulation time |
| --- | --- | --- | --- | --- | --- |
| 1 | $T_0$ | (3) | 17 | 1 | 8.2 |
| 2 | 2 | 3.6 | 18 | 0 | 8.4 |
| 3 | 2 | 4.2 | 19 | 0 | 8.6 |
| 4 | 2 | 4.8 | 20 | 0 | 8.8 |
| 5 | 1 | 5.2 | 21 | 1 | 9.2 |
| 6 | 1 | 5.6 | 22 | 0 | 9.4 |
| 7 | 0 | 5.8 | 23 | 0 | 9.6 |
| 8 | 0 | 6.0 | 24 | 0 | 9.8 |
| 9 | 0 | 6.2 | 25 | 1 | 10.2 |
| 10 | 0 | 6.4 | 26 | 0 | 10.4 |
| 11 | 0 | 6.6 | 27 | 1 | 10.8 |
| 12 | 0 | 6.8 | 28 | 2 | 11.4 |
| 13 | 1 | 7.2 | 29 | 2 | 12.0 |
| 14 | 0 | 7.4 | 30 | 3 | 12.8 |
| 15 | 0 | 7.6 | 31 | 5 | 14.0 |
| 16 | 0 | 7.8 | 32 | 7 | 16.0 |

The energization code train shown in Table 2 ($T_0$ 22211000000100010001000010122357) corresponds to the energization time-concentration characteristic shown in FIG. 4.

This energization code train is determined in such a manner as to coincide with the energization time-concentration characteristic for respective temperatures of the respective inking paper in accordance with the type of the inking paper and the head temperature as far as possible.

Explanation will be made now of the operation for printing by use of this energization code train. Although FIG. 2 covers 16 gradations, and FIG. 4 and Table 2 32 gradations, they are assumed to be the same gradations by way of explanation.

The above-mentioned energization codes are held at the memory 51. The energization code read from the memory 51 is supplied as data of a number of counts corresponding to the energization code through the converter circuit 55. The shift register 11 has the first heating data d(1) held therein. The switch 54 is turned on upon completion of the holding of the heating data in the latch circuit 12, and applies a "1" signal to the AND circuit 13. Since all the bits of the heating data d(1) are "1", all the heat-generating resistors 14 are energized. The counter 52 counts the clock pulse supplied to the terminal d up to a count corresponding to the energization code ($T_0$) from the memory 51, and when the count comes to coincide with the count corresponding to the energization code, reverses the output thereof. The switch 54 applies a "0" signal to the AND circuit 13 upon reversal of the output of the counter 52. The resistors 14 thus stop heat generation. The gradation pointer 53 detects the shift to the next gradation by the reversal of the output of the counter 52, and applies the heating data d(2) for the gradation produced from the comparator circuit 7 on the basis of the video signal read from the line memory 5, to the shift resistor 11 and holds the latch circuit 12. Upon completion of holding at the latch circuit 12, the switch 54 is turned on, and kept turned on until the counter 52 reaches a count corresponding to the energization code "2" representing the gradation "2". In similar manner, in printing of the n-th gradation, the heating data d(n) is held at the latch circuit 12, and the switch 54 is kept on until the counter 52 reaches a number of counts corresponding to the energization code representing the n-th gradation, while the heat-generating resistors 14 continue to be energized.

When the above-mentioned operation is performed up to the last gradation, the video signal for the next line is applied to the line memory 6 for the counter 52 to perform the printing of the next line.

In the configuration described above, the energization time corresponding to the concentration to be printed is set by the temperature of the heat-sensitive head 1 immediately before energization of the heat-generating members 14, thus making it possible to prevent the print concentration from changing with the ambient temperature or the temperature of the heat-sensitive head 1 from increasing gradually with the repetition of the printing processes. Especially in the full color printer for printing by use of the three primary colors of cyan, magenta and yellow by tone reduction, which are laid one on another in multiple gradations, a slight change in the concentration to be printed causes a change in hue or chroma after mixing the colors. According to the present invention, this fine change in printing concentration may be controlled.

Generally, the energization code train is desirably generated immediately before printing of each color. If the energization code train is changed during the printing operation, the concentration undergoes an undesirable change even with an image signal including continuous or a predetermined gradation data. As illustrated above, however, the energization codes need not be limited to eight types, but about 256 types corresponding to 00 to FF in sexadecimal notation may be provided. At the same time, by increasing the resolution of the temperature data sufficiently, the energization code train may be generated for each line printed or the energization time corresponding to a given concentration may be changed gradually with the printing. In this case, the concentration increase with heat accumulation of the heat-sensitive head during the printing of a color is reduced remarkably.

It will thus be understood from the foregoing detailed description that according to the present invention, the energization time is capable of being controlled for the gradation data at a temperature substantially with reference to energization code data of types in a number equivalent to the resolutions of the temperature data of the heat-sensitive head with a memory of small capacity. As a result, the controlling accuracy of the printing concentration is remarkably improved. Also, the reproducibility of the hue and chroma for the full-color printing is improved.

In the conventional apparatuses, the gradation step time is directly stored in a memory as data on gradation recording, and clock pulses are counted in accordance with the gradation step time in order to effect gradation recording. According to the present invention, by contrast, the gradation data are provided as a combination of unit energization time codes, and the combination is corrected by the temperature at the time of printing, thus making possible accurate gradation recording with a small capacity of memory.

We claim:

1. A signal-processing circuit for heat-sensitive recording apparatus comprising a heat-generating member arranged in opposed relations with a recording medium for generating heat by a current flowing therethrough, and energization time control means for controlling the energization time of a current supplied to said heat-generating member in accordance with the level of a digital video signal applied thereto; said apparatus further comprising:

an initial value memory for storing the energization time-concentration characteristic data for a standard temperature;

a correction data memory for storing data on the change rate of the energization time-concentration characteristic against temperature change;

temperature detector means arranged in the vicinity of said heat-generating member for detecting the temperature of said heat-generating member;

energization code train generator means connected to said temperature detector means and said initial value memory for reading from said correction data memory the change rate data corresponding to the temperature data from the said temperature detector means, correcting the energization time-concentration characteristic data read from said initial value memory by the change rate data read, and generating an energization code train (representing the current supply time to said heat generating resistors corresponding to each of gradation levels into which the maximum recording concentration of an image to be printed is divided) in accordance with the corrected energization time-concentration characteristic data;

gradation control means connected to said energization code train generator means and said heat-generating member, and supplied with energization code train sequentially corresponding to low to high gradation levels from said energization code train generator means, said gradation control means comparing the digital value of the video signal input with the digital value of the energization code train supplied from said energization code train generator means for each of the gradation levels represented by the energization code train, said heat-generating member being supplied with current during a time period corresponding to the energization code train in the case where the digital value of the energization code train is lower than that of the video signal input.

2. An apparatus according to claim 1, wherein said gradation control means includes converter means for converting said energization code into a number of clock pulses, a counter for counting the clock pulses up to said number of clock pulses, and switch means for energizing said heat-generating member only while said counter continues the counting operation.

3. An apparatus according to claim 2, wherein said heat-generating member includes a plurality of heat-generating resistors.

4. An apparatus according to claim 3, wherein each of said heat-generating resistors is supplied with current only for a time length corresponding to the digital value of the respective digital video signals.

5. An apparatus according to claim 4, wherein said gradation control means compares the digital value of the digital video signal applied to each of said heat-generating resistors for each gradation with the digital value of the energization code train, and generates a mask data signal for opening said switch means when the digital value of the video signal is lower than that of the energization code train, said mask data signal being applied to said switch means.

* * * * *